(12) United States Patent
Wang et al.

(10) Patent No.: US 11,194,741 B2
(45) Date of Patent: Dec. 7, 2021

(54) CONTROL DEVICE AND ADJUSTMENT METHOD

(71) Applicant: Nuvoton Technology Corporation, Hsinchu Science Park (TW)

(72) Inventors: Cheng-Chih Wang, Jhubei (TW); Chih-Ping Lu, Hsinchu (TW); Yung-Chi Lan, Taichung (TW); Chun-Chi Chen, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 30 days.

(21) Appl. No.: 16/731,565

(22) Filed: Dec. 31, 2019

(65) Prior Publication Data

US 2021/0034551 A1 Feb. 4, 2021

(30) Foreign Application Priority Data

Aug. 2, 2019 (TW) .................................. 108127439

(51) Int. Cl.
*G06F 13/36* (2006.01)
*G06F 13/16* (2006.01)
*G05F 1/56* (2006.01)

(52) U.S. Cl.
CPC ............ *G06F 13/1605* (2013.01); *G05F 1/56* (2013.01)

(58) Field of Classification Search
CPC ......... G06F 13/00; G06F 13/1605; G05F 1/56
USPC .......... 710/305–306; 713/322–323, 300–400
See application file for complete search history.

(56) References Cited

U.S. PATENT DOCUMENTS

| | | | |
|---|---|---|---|
| 2009/0158061 A1* | 6/2009 | Schmitz ................ | G06F 1/3228 713/300 |
| 2013/0179710 A1* | 7/2013 | Chang .................. | G06F 1/3287 713/322 |

* cited by examiner

*Primary Examiner* — Tim T Vo
*Assistant Examiner* — Kim T Huynh
(74) *Attorney, Agent, or Firm* — Muncy, Geissler, Olds & Lowe, P.C.

(57) ABSTRACT

A control device is used to adjust an output voltage of a voltage generator, and includes a master circuit, a slave circuit, and a power-scaling control circuit. The master circuit is coupled to a first bus. The slave circuit is coupled to a second bus. In a normal mode, the first and second buses are connected to each other via the power-scaling control circuit, the master circuit accesses the slave circuit via the first and second buses. In an adjustment mode, the power-scaling control circuit controls the master circuit to stop accessing the slave circuit, and the power-scaling control circuit adjusts the output voltage. When the master circuit sends a trigger signal, the power-scaling control circuit enters the adjustment mode. When the master circuit does not send the trigger signal, the power-scaling control circuit enters the normal mode.

17 Claims, 3 Drawing Sheets

CONTROL DEVICE AND ADJUSTMENT METHOD

CROSS-REFERENCE TO RELATED APPLICATION

This application claims the benefit of Taiwan Patent Application No. 108127439, filed on Aug. 2, 2019, in the Taiwan Intellectual Property Office, the disclosure of which is incorporated herein in its entirety by reference.

BACKGROUND OF THE INVENTION

1. Field of the Invention

The present invention relates to a control device, more particularly to a control device which is able to control an output voltage of a voltage regulator.

2. Description of the Related Art

With the advancement of technology, the functions and types of electronic devices are increasing. Generally, an electronic device has at least one voltage generator for providing at least one operating voltage. When the operating voltage is unstable, the electronic component that operates upon the operating voltage may malfunction because of the unstable operating voltage.

SUMMARY OF THE INVENTION

An objective of the present invention is to provide a control device applied to adjust an output voltage of a voltage generator. The control device includes a master circuit, a slave circuit and a power-scaling power-scaling control circuit. The master circuit is coupled to a first bus. The slave circuit is coupled to a second bus. The power-scaling control circuit is coupled between the first bus and the second bus. In a normal mode, the first bus and the second bus are connected to each other via the power-scaling control circuit, so that the master circuit accesses the slave circuit via the first bus and the second bus. In an adjustment mode, the power-scaling control circuit controls the master circuit to stop accessing the slave circuit, and the power-scaling control circuit then adjusts the output voltage. When the master circuit sends a trigger signal, the power-scaling control circuit enters the adjustment mode, and when the master circuit does not send the trigger signal, the power-scaling control circuit enters the normal mode.

Another objective of the present invention is to provide an adjustment method applied to adjust operating voltages of a master circuit and a slave circuit, and the master circuit is coupled to a first bus, and the slave circuit is coupled to a second bus. The adjustment method includes steps of: determining whether the master circuit executes a specific program code; when the master circuit does not execute the specific program code, electrically connecting the first bus to the second bus, wherein the master circuit accesses the slave circuit according to the specific signal on the first bus; when the master circuit executes the specific program code, controlling the master circuit to enter a waiting state to pause the access to the slave circuit, and adjusting the operating voltage, and when the operating voltage is equal to the predetermined value, controlling the master circuit to leave from the waiting state.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
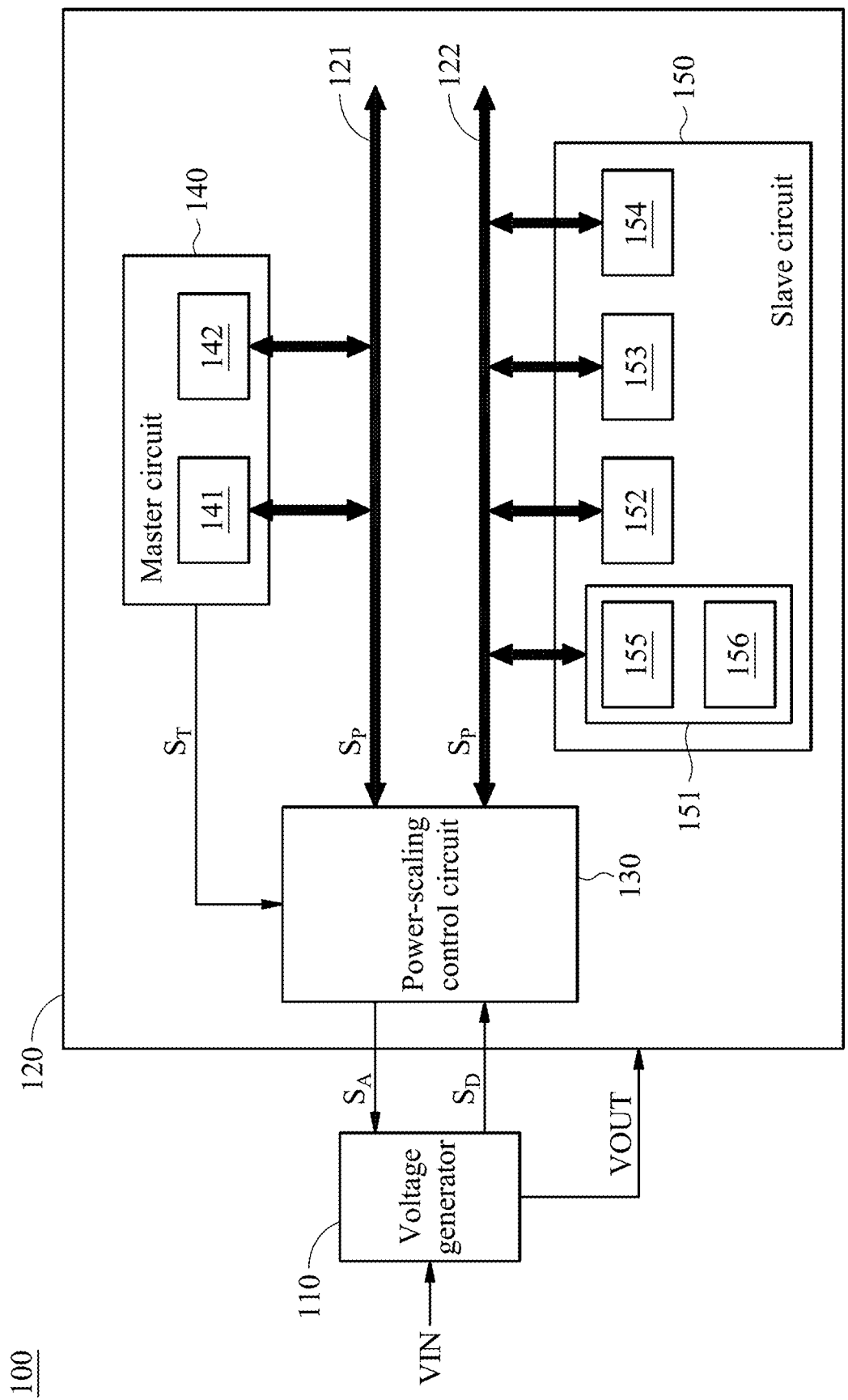
FIG. 1 is a schematic view of an operating system of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements. Furthermore, some reference numbers of different embodiments in drawing figure are partially repeated for simplifying illustration, and it is not intended to indicate the association between the different embodiments FIG. 1 is a schematic view of an operating system of the present invention. As shown in FIG. 1, the operating system 100 comprises a voltage generator 110 and a control device 120. The voltage generator 110 can convert a voltage level of an input voltage VIN to an output voltage VOUT. In an embodiment, the voltage generator 110 is used to rise a voltage level of the input voltage VIN, the risen voltage is used as the output voltage VOUT. As a result, the output voltage VOUT is higher than the input voltage VIN, but the present invention is not limited to above-mentioned example. In other embodiments, the voltage generator 110 can be used to lower the input voltage VIN; in this example, the output voltage VOUT is lower than the input voltage VIN. The circuit architecture of the voltage generator 110 of the present invention is not limited to the example illustrated herein. In an embodiment, the voltage generator 110 can be a voltage regulator. In some embodiments, the output voltage VOUT generated by the voltage generator 110 serves as an operating voltage of the control device 120.

The control device 120 comprises a power-scaling control circuit 130, a master circuit 140, and a slave circuit 150. As shown in FIG. 1, the master circuit 140 is coupled to a bus 121. The master circuit 140 executes a program code, and transmits a command, such as a read command or a write command, via the bus 121. In this embodiment, according to a specific signal $S_P$ on the bus 121, the master circuit 140 can receive data from the bus 121, or provide data to the bus 121.

For example, when the specific signal $S_P$ is a ready voltage level, such as a high voltage level, the master circuit 140 can read data from the bus 121, or provide data to the bus 121; however, when the specific signal $S_P$ is a waiting voltage level, such as a low voltage level, the master circuit 140 enters a waiting state and temporarily not read data from the bus 121 and temporarily not provide data to the bus 121.

In this embodiment, when the master circuit 140 executes a power-scaling program code, the master circuit 140 outputs a trigger signal $S_T$ to notify the power-scaling control circuit 130. The architecture of the master circuit 140 of the present invention is not limited to the examples illustrated herein, and any circuit capable of sending an access command can be used as the master circuit 140. In an embodiment, the master circuit 140 includes at least one of a central processing unit 141 and a DMA controller 142. In this embodiment, the operating voltage of the master circuit 140 is the output voltage VOUT.

The slave circuit 150 is coupled to a bus 122, and configured to operate according to the command on the bus 122. For example, when the slave circuit 150 receives the read command through the bus 122, the slave circuit 150 provides output data to the bus 122, and set the specific signal $S_P$ to be the ready voltage level. When the slave circuit 150 receives a write command through the bus 122, the slave circuit 150 receives data transmitted on the bus 122, and sets the specific signal $S_P$ to be the ready voltage level. In a condition that the slave circuit 150 does not provide output data to the bus 122 yet, the slave circuit 150 sets the specific signal $S_P$ to be the waiting voltage level. Similarly, in a condition that the slave circuit 150 is not ready to receive the data transmitted on the bus 122, the slave circuit 150 sets the specific signal $S_P$ to be the waiting voltage level. In this embodiment, the operating voltage of the slave circuit 150 is also the output voltage VOUT.

The architecture of the slave circuit 150 of the present invention is not limited to examples illustrated herein. In an embodiment, the slave circuit 150 comprises memories 151 and 152, and peripheral chips 153 and 154. The memory 151 comprise a controller 155 and a memory array 156. The controller 155 accesses the memory array 156 according to the command on the bus 122. In this embodiment, each of the memories 151 and 152 can be a volatile memory. For example, the memory 151 can be a flash memory, and the memory 152 can be a static random-access memory (SRAM), but the present invention is not limited thereto. In other embodiments, at least one of the memories 151 and 152 can be a non-volatile memory.

The types of the peripheral chip 153 and 154 of the present invention are not limited to examples illustrated herein. In an embodiment, the peripheral chip 153 can be an advanced high-performance bus (AHB) peripheral chip coupled to an external storage device. In another embodiments, the peripheral chip 154 can be an advanced peripheral bus (APB) bridge coupled to a peripheral device, which is not shown in FIG. 1, and the APB bridge can optimize power consumption of the peripheral device.

The power-scaling control circuit 130 is coupled between the buses 121 and 122, and can be operated in a normal mode or an adjustment mode. In this embodiment, when the master circuit 140 executes the power-scaling program code, the master circuit 140 outputs the trigger signal $S_T$, to trigger the power-scaling control circuit 130 to enter the adjustment mode. When the master circuit 140 does not execute the power-scaling program code, the master circuit 140 does not output the trigger signal $S_T$, and the power-scaling control circuit 130 enters the normal mode.

In the normal mode, the buses 121 and 122 are electrically connected to each other via the power-scaling control circuit 130, so that the master circuit 140 can perform handshaking with the slave circuit 150 via the buses 121 and 122. In an embodiment, according to the voltage level of the specific signal $S_P$, the master circuit 140 can determine whether the slave circuit 150 is ready. For example, when the specific signal $S_P$ is the waiting voltage level, it indicates that the slave circuit 150 is not ready, so the master circuit 140 enters the waiting state and temporarily does not access the slave circuit 150 via the buses 121 and 122. When the specific signal $S_P$ is the ready voltage level, the master circuit 140 can access the slave circuit 150 via the buses 121 and 122.

In the adjustment mode, the power-scaling control circuit 130 controls the master circuit 140 to stop accessing the slave circuit 150. In the present invention, how the power-scaling control circuit 130 controls or commands the master circuit 140 to stop accessing the slave circuit 150 is not limited to the examples illustrated herein. In an embodiment, the power-scaling control circuit 130 can set the specific signal $S_P$ to be the waiting voltage level, to make the master circuit 140 enter the waiting state and pause access to the slave circuit 150. At this time, the slave circuit 150 is unable to change the voltage level of the specific signal $S_P$.

In the adjustment mode, the power-scaling control circuit 130 provides an adjustment signal $S_A$ to the voltage generator 110. The voltage generator 110 adjusts the output voltage VOUT according to the adjustment signal $S_A$. In an embodiment, the voltage generator 110 can lower the output voltage VOUT, for example, from 3.3V to 1.5V. During the process where the voltage generator 110 adjusts the output voltage VOUT, operations of the master circuit 140 and the slave circuit 150 are paused. For example, in the memory 151, the controller 155 pauses the access to the memory array 156 in the adjustment mode.

After the adjusting operation is completed, the voltage generator 110 generates a complete signal $S_D$. The power-scaling control circuit 130 leaves from the adjustment mode according to the complete signal $S_D$ and enters the normal mode again. In the normal mode, the power-scaling control circuit 130 does not control the voltage level of the specific signal $S_P$ anymore. At this time, the specific signal $S_P$ is controlled by the slave circuit 150. The slave circuit 150 can set the voltage level of the specific signal $S_P$ according to the state thereof. For example, when the slave circuit 150 provides output data to the bus 122 already or is ready to receive data from the bus 122, the slave circuit 150 can set the specific signal $S_P$ to be the ready voltage level, so that the master circuit 140 can receive the output data from the bus 122 via the bus 121 or provide data to the bus 122 via the bus 121. However, when the slave circuit 150 does not provide output data to the bus 122 yet or is not ready to receive data from the bus 122, the slave circuit 150 can set the specific signal $S_P$ to be the waiting voltage level, so that the master circuit 140 does not access the slave circuit 150 via the buses 121 and 122 temporarily.

In this embodiment, in the adjustment mode, the voltage generator 110 adjusts the output voltage VOUT according to the adjustment signal $S_A$. At this time, operations of the master circuit 140 and the slave circuit 150 are stopped, so as to prevent from false operations of the master circuit 140 and the slave circuit 150 due to unstable output voltage. Furthermore, when the voltage generator 110 lowers the output voltage VOUT, the master circuit 140 and the slave circuit 150 can be operated according to the lowered output voltage VOUT, so as to reduce power consumption of the master circuit 140 and the slave circuit 150. Furthermore, when the specific signal $S_P$ is the waiting voltage level, the master circuit 140 pauses operation until the specific signal $S_P$ becomes the ready voltage level, so that the master circuit 140 does not need to enter the sleep mode and it does not need to spent additional time to wake up the master circuit 140.

In other embodiments, when the master circuit 140 outputs the trigger signal ST, the power-scaling control circuit 130 monitors the state of the bus 122, to determine whether the slave circuit 150 is executing an access operation. When the slave circuit 150 is executing the access operation, the power-scaling control circuit 130 is continuously operated in the normal mode, to electrically connect the buses 121 and 122 together. When the slave circuit 150 completes the access operation, the power-scaling control circuit 130 leaves from the normal mode and enters the adjustment mode, so as to adjust the output voltage VOUT and control the master circuit 140 to enter the waiting state.

Figure 2A:
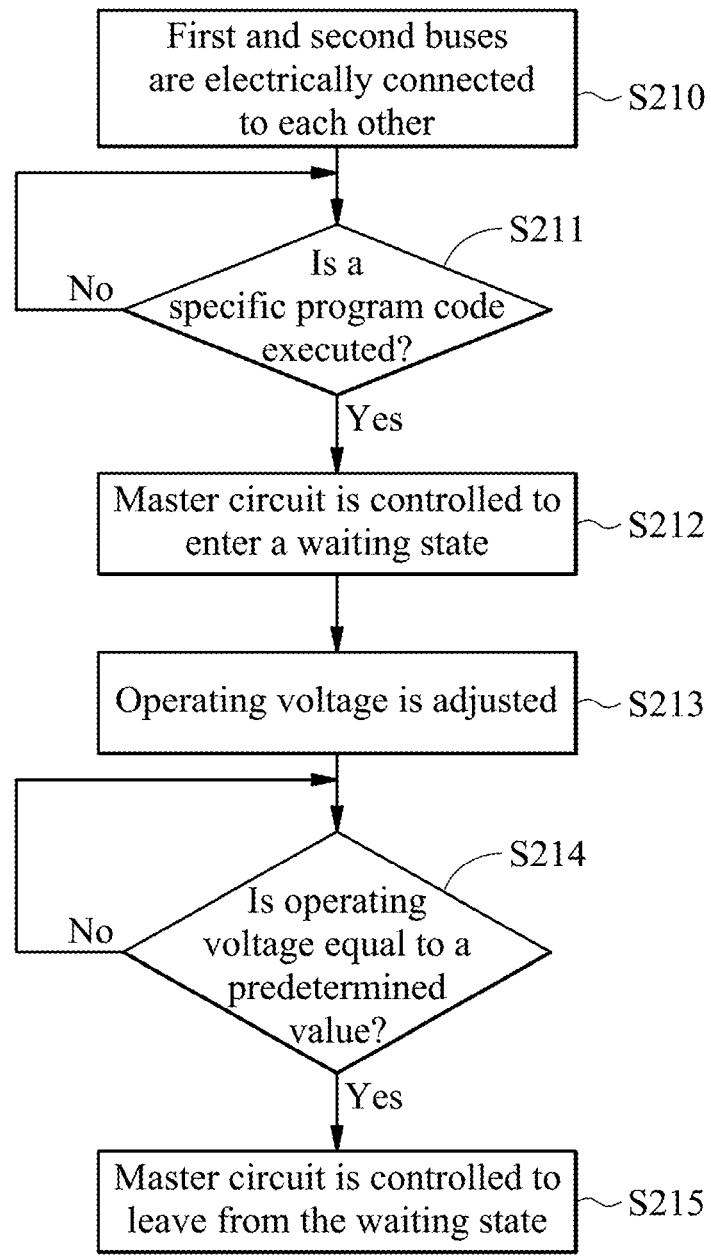
FIG. 2A is a flowchart of an embodiment of an adjustment method of the present invention.

FIG. 2A is a flowchart of an embodiment of an adjustment method of the present invention. The adjustment method of the present invention can be used to adjust operating voltages of a master circuit and a slave circuit. In an embodiment, the operating voltage is an output voltage of a voltage regulator. The voltage regulator can convert a voltage level of an input voltage, and the converted voltage is used as the operating voltage and provided to the master circuit and the slave circuit. In this embodiment, the master circuit is coupled to a first bus, and the slave circuit is coupled to a second bus.

First, in a step S210, the first and second buses are electrically connected to each other, so that the master circuit can access the slave circuit via the first and second buses. The architectures of the master circuit and the slave circuit of the present invention are not limited to the examples illustrated herein, and any circuit capable of sending an access command can be used as the master circuit. In an embodiment, the master circuit includes at least one of a central processing unit and a DMA controller. In other embodiments, the circuit capable of replying the command sent from the master circuit can be used as the slave circuit. In an embodiment, the slave circuit comprises a memory and a peripheral chip, for example, an AHB peripheral chip or an APB bridge.

Next, in a step S211, it determines whether the master circuit executes a specific program code. In an embodiment, the specific program code can be executed to adjust the operating voltage of the master circuit. When the master circuit does not execute the specific program code, it indicates that it does not need to adjust the operating voltage, the flow returns to the step S210, and the first and second buses are still connected to each other. At this time, the master circuit accesses the slave circuit according to a specific signal on the first bus.

For example, when the specific signal is the waiting voltage level, it indicates that the slave circuit is not ready yet, so the master circuit stays in the waiting state. When the specific signal is the ready voltage level, it indicates that the slave circuit is ready already, so the master circuit can receive data from the slave circuit or write data into the slave circuit.

However, when the master circuit executes the specific program code, it indicates that it needs to adjust the operating voltage, so in a step S212 the master circuit is controlled to enter the waiting state and the accesses to the slave circuit is paused. In an embodiment, in a step S212, the specific signal on the first bus is set as a waiting voltage level, and at this time, the specific signal is not controlled by the slave circuit anymore. In an embodiment, the specific signal is controlled by the power-scaling control circuit. In other embodiments, after the master circuit enters the waiting state, the slave circuit possibly stops operation.

In a step S213, after the master circuit enters the waiting state, it starts to adjust the operating voltage. In this embodiment, during the process of adjusting the operating voltage, operations of the master circuit and the slave circuit are paused, so false operations of the master circuit and the slave circuit due to unstable operating voltage can be prevented. In an embodiment, a power-scaling control circuit can send an adjustment signal to the voltage regulator. The voltage regulator adjusts the operating voltage according to the adjustment signal. In an embodiment, the voltage regulator can lower the operating voltage, but the present invention is not limited thereto. In other embodiments, the voltage regulator can rise the operating voltage according to the adjustment signal.

In a step S214, it determines whether the operating voltage is equal to a predetermined value. In an embodiment, when the voltage regulator completes the adjusting operation, the voltage regulator generates a complete signal. Therefore, according to the complete signal, the power-scaling control circuit can determine whether the operating voltage is equal to the predetermined value already. When the power-scaling control circuit does not receive the complete signal yet, it indicates that the operating voltage is not equal to the predetermined value, so the flow returns to the step S214, and the power-scaling control circuit waits for the voltage regulator to generate the complete signal.

When the voltage regulator generates the complete signal, it indicates that the operating voltage is equal to the predetermined value, so in a step S215 the master circuit is controlled to leave from the waiting state. In an embodiment, when the master circuit leaves from the waiting state, the slave circuit can control the voltage level of the specific signal. In this example, when the slave circuit is ready, the slave circuit can set the specific signal as the ready voltage level, such as a high voltage level; otherwise, when the slave circuit is not ready, the slave circuit sets the specific signal as the waiting voltage level, such as a low voltage level. At this time, the power-scaling control circuit does not control the specific signal anymore.

When the voltage regulator lowers the operating voltage according to the adjustment signal, the power consumption of the master circuit and the slave circuit can be reduced. After the adjusting operation on the voltage regulator is completed, the master circuit and the slave circuit can operate according to the operating voltage, so as to ensure normal operations of the master circuit and the slave circuit. Furthermore, even when the master circuit stays in the waiting mode and waits for the slave circuit to be ready, the master circuit is continuously operated in the normal mode. Since the master circuit does not need to leave from the normal mode to enter the sleep mode, it does not need to spent time to wait for the master circuit to enter the normal mode again.

Figure 2B:
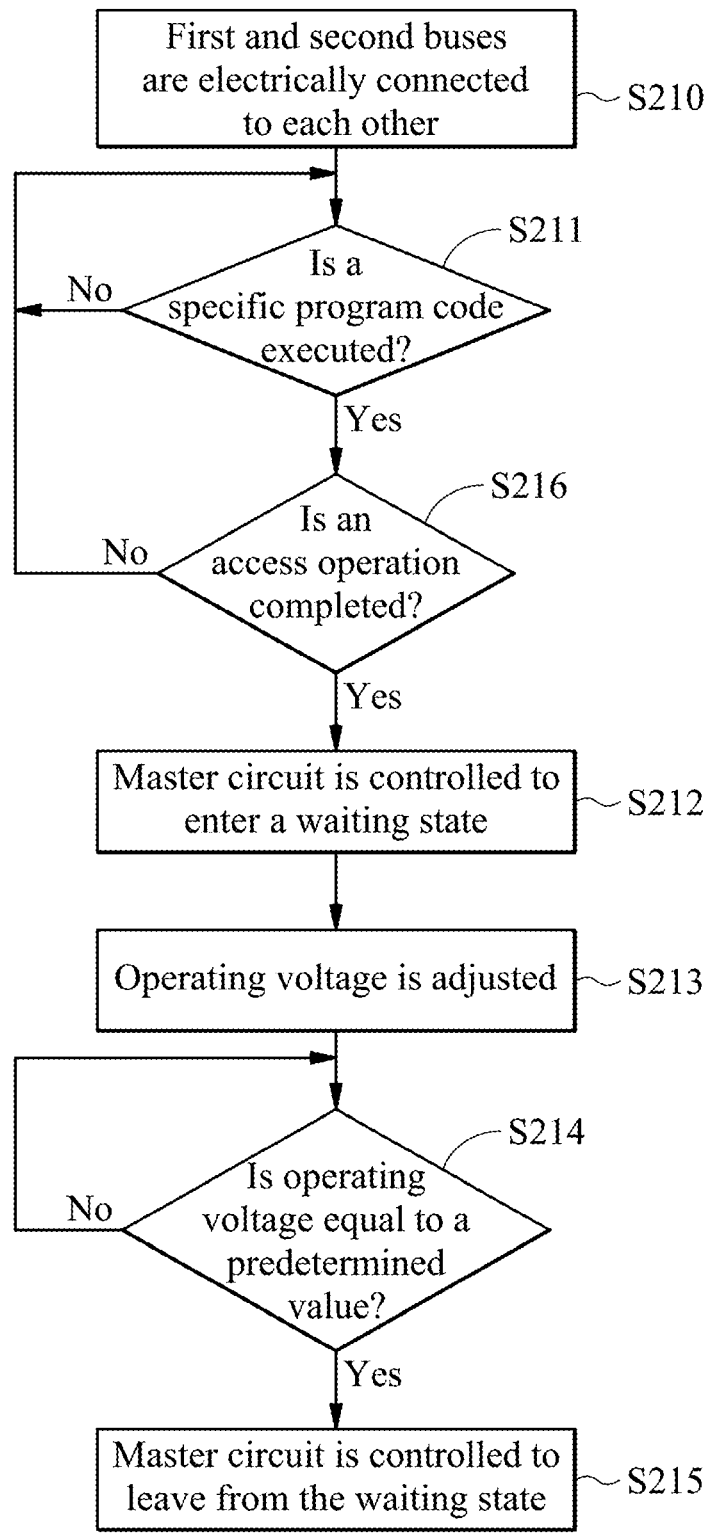
FIG. 2B is a flowchart of another embodiment of an adjustment method of the present invention.

FIG. 2B is a flowchart of another embodiment of an adjustment method of the present invention. FIG. 2B is similar to FIG. 2A, and the difference between this embodiment of FIG. 2B and the previous embodiment is that this embodiment of FIG. 2B includes a step S216 additionally. The steps S210 to S215 of FIG. 2B are the same as that of FIG. 2A, so their detailed descriptions are not repeated herein. In this embodiment, when the master circuit executes the specific program code, the master circuit monitors the state of the second bus to determine whether the slave circuit is executing an access operation or whether the access operation is completed, in a step S216. In the step S210, when the slave circuit is executing the access operation, the first and second buses are kept in electrical connection. In the step S212, when the slave circuit completes the access operation, the master circuit is controlled to enter the waiting state.

The adjustment method, the specific type or a part of the adjustment method of the present invention can exist in the form of program code. The program code can be stored in physical medium, such as floppy disc, compact disc, hard disk or any other machine-readable storage medium (such as computer readable storage medium), or a computer program product which is not limited in external form. When the program code is loaded into and executed by a machine, such as a computer, this machine becomes the control device of the present invention. The program code can be transmitted by transmission medium such as an electric wire or a cable, fiber or any transmission manner, and when the program code is received, loaded into and executed by a machine, such as a computer, the machine becomes the device of the present invention. When the control device is implemented by a general-purpose processing unit, the general-purpose processing unit in cooperation with the program code can provide an operate similar to a dedicated device using specific logic circuits.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A control device, applied to adjust an output voltage of a voltage generator externally connected to the control device, and comprising:
    a master circuit coupled to a first bus;
    a slave circuit coupled to a second bus; and
    a power-scaling control circuit coupled between the first bus and the second bus, wherein in a normal mode, the first bus and the second bus are connected to each other via the power-scaling control circuit, so that the master circuit accesses the slave circuit via the first bus and the second bus, wherein in an adjustment mode, the power-scaling control circuit controls the master circuit to stop accessing the slave circuit, and the power-scaling control circuit then adjusts the output voltage;
    wherein responsive to the master circuit sending a trigger signal, the power-scaling control circuit enters the adjustment mode, and responsive to the master circuit not sending the trigger signal, the power-scaling control circuit enters the normal mode,
    wherein in the adjustment mode, operations of the master circuit and the slave circuit are stopped.

2. The control device according to claim 1, wherein in the adjustment mode, the power-scaling control circuit sets a specific signal, transmitted on the first bus and the second bus, to be a waiting voltage level, so as to control the master circuit to stop accessing the slave circuit.

3. The control device according to claim 2, wherein in the normal mode, the slave circuit provides the specific signal to the master circuit via the first bus and the second bus.

4. The control device according to claim 1, wherein in the normal mode, the master circuit and the slave circuit are operated according to the output voltage.

5. The control device according to claim 1, wherein the master circuit comprise at least one of a Central Processing Unit and a DMA controller.

6. The control device according to claim 1, wherein the slave circuit comprises at least one memory and at least one peripheral chip.

7. The control device according to claim 1, wherein the voltage generator is a voltage regulator.

8. The control device according to claim 1, wherein the voltage regulator generates the output voltage according to an input voltage, and the input voltage is higher than the output voltage.

9. The control device according to claim 1, wherein responsive to the master circuit outputting the trigger signal, the power-scaling control circuit monitors a state of the second bus, to determine whether the slave circuit is executing an access operation, and responsive to the slave circuit executing the access operation, the power-scaling control circuit is operated in the normal mode, and responsive to the slave circuit completing the access operation, the power-scaling control circuit enters the adjustment mode.

10. An adjustment method, applied to adjust operating voltages of a master circuit and a slave circuit, wherein the master circuit is coupled to a first bus, and the slave circuit is coupled to a second bus, and the adjustment method comprises:
    determining whether the master circuit executes a specific program code;
    responsive to determining that the master circuit does not execute the specific program code, electrically connecting the first bus to the second bus, wherein the master circuit accesses the slave circuit according to a specific signal on the first bus;
    responsive to determining that the master circuit executes the specific program code,
    controlling the master circuit to enter a waiting state, to pause the access to the slave circuit; and
    adjusting the operating voltage;
    responsive to the operating voltage being equal to the predetermined value, controlling the master circuit to leave from the waiting state,
    wherein in response to the operating voltage being adjusted, operations of the master circuit and the slave circuit are stopped.

11. The adjustment method according to claim 10, further comprising:

responsive to determining that the master circuit executes the specific program code, setting the specific signal to be a waiting voltage level, so as to control the master circuit to pause the access to the slave circuit.

12. The adjustment method according to claim 10, wherein responsive to the operating voltage being equal to the predetermined value, the slave circuit provides the specific signal to the master circuit.

13. The adjustment method according to claim 10, wherein responsive to the operating voltage being equal to the predetermined value, the master circuit and the slave circuit are operated according to the operating voltage.

14. The adjustment method according to claim 10, wherein responsive to the master circuit entering the waiting state, operations of the master circuit and the slave circuit are paused.

15. The adjustment method according to claim 10, wherein the step of adjusting the operating voltage further comprises:

sending an adjustment signal to a voltage regulator; and determining whether the voltage regulator generates a complete signal;

wherein responsive to determining that the voltage regulator generates the complete signal, it indicates that the operating voltage is equal to the predetermined value.

16. The adjustment method according to claim 10, further comprising:

responsive to determining that the master circuit executes the specific program code, monitoring a state of the second bus, to determine whether the slave circuit is executing an access operation;

responsive to determining that the slave circuit is executing the access operation, electrically connecting the first bus to the second bus; and responsive to the slave circuit completing the access operation, controlling the master circuit to enter the waiting state.

17. The control device according to claim 1, wherein:

the master circuit receives data from the first bus or provides data to the first bus according to a specific signal, in the adjustment mode, the power-scaling control circuit sets the specific signal, and in the normal mode, the slave circuit sets the specific signal.

* * * * *